United States Patent
Singh et al.

(10) Patent No.: US 11,766,641 B2
(45) Date of Patent: Sep. 26, 2023

(54) NANOADSORBENT BASED USER-FRIENDLY HOUSEHOLD FILTER FOR THE PURIFICATION OF FLUORIDE AND ARSENIC CONTAMINATED DRINKING WATER

(71) Applicant: Council of Scientific and Industrial Research, New Delhi (IN)

(72) Inventors: Indra Bhushan Singh, Madhya Pradesh (IN); Archana Singh, Madhya Pradesh (IN); Swati Dubey, Madhya Pradesh (IN); Akshay Singh Tomar, Madhya Pradesh (IN); Priyanka Arya, Madhya Pradesh (IN); Avanish Kumar Srivastava, Madhya Pradesh (IN)

(73) Assignee: COUNCIL OF SCIENTIFIC AND INDUSTRIAL RESEARCH, New Delhi (IN)

(*) Notice: Subject to any disclaimer, the term of this patent is extended or adjusted under 35 U.S.C. 154(b) by 130 days.

(21) Appl. No.: 16/421,220

(22) Filed: May 23, 2019

(65) Prior Publication Data
US 2019/0358592 A1    Nov. 28, 2019

(30) Foreign Application Priority Data
May 23, 2018    (IN) .............................. 201811019279

(51) Int. Cl.
*B01D 69/12*    (2006.01)
*B01D 69/02*    (2006.01)
(Continued)

(52) U.S. Cl.
CPC ............. *B01D 69/12* (2013.01); *B01D 69/02* (2013.01); *B01D 71/025* (2013.01); *B01D 71/26* (2013.01);
(Continued)

(58) Field of Classification Search
CPC ...... B01D 69/12; B01D 69/02; B01D 71/025; B01D 71/26; B01D 2253/104;
(Continued)

(56) References Cited

U.S. PATENT DOCUMENTS

| | | | |
|---|---|---|---|
| 4,968,426 A * | 11/1990 | Hay .................... | B01D 67/0048 427/247 |
| 2008/0156734 A1* | 7/2008 | Burba ..................... | C02F 1/281 210/679 |

(Continued)

FOREIGN PATENT DOCUMENTS

CN         101422720 B       5/2009

OTHER PUBLICATIONS

Zamorategui et al, Synthesis and characterization of gamma alumina and compared with an activated charcoal on the fluoride removal from potable well water, Feb. 2, 2016, p. 1-6 (Year: 2016).*

(Continued)

*Primary Examiner* — Bobby Ramdhanie
*Assistant Examiner* — Donovan Bui-Huynh
(74) *Attorney, Agent, or Firm* — LEWIS ROCA ROTHGERBER CHRISTIE LLP

(57) ABSTRACT

A nanoadsorbent based filter is used for purification of fluoride and arsenic contaminated water. 140-150 g low cost (~10 USD/kg) nanoparticles of gamma alumina of 20-25 mg/g fluoride and 25-30 mg/g arsenic adsorption capacity is incorporated in propylene filter without susceptibility of leaching incorporated nanoparticles in water. The cost of domestic defluoridation device containing low cost nano-alumina incorporated filters/cartridges along with housing, overhead tank, tubing and treated water storage container etc. is of very low cost of around 25 USD/device. The fluoride treatment cost would be <0.5 USD/100 lit for 4-5 mg/l fluoride water after 2-3 regenerations while, the arsenic (Continued)

The drawing of the purifier operating for continuous treatment treatment cost using domestic filtration device would be <0.25 USD/100 lit for 90-100 µg/l arsenic (III) water. A method incorporates nanoadsorbent in a sediment removal filter candle and provides a household defluoridation device capable of treatment of fluoride and arsenic contaminated ground/drinking water without electricity.

6 Claims, 3 Drawing Sheets

(51) Int. Cl.
  B01D 71/02    (2006.01)
  B01D 71/26    (2006.01)
  C02F 1/00     (2023.01)
  C02F 101/10   (2006.01)
  C02F 101/14   (2006.01)
(52) U.S. Cl.
  CPC .......... *C02F 1/003* (2013.01); *B01D 2319/02* (2013.01); *C02F 2101/103* (2013.01); *C02F 2101/14* (2013.01); *C02F 2201/006* (2013.01)
(58) Field of Classification Search
  CPC .............. B01D 2319/02; B01D 15/00; B01D 2239/0407; B01D 2321/04; B01D 24/008; B01D 24/12; B01D 37/02; B01D 39/06; B01D 53/0423; B01D 53/0446; B01D 61/08; B01D 61/18; B01D 63/10; B01D 65/02; B01D 15/22; B01D 2239/025; B01D 2239/0258; B01D 2239/0478; B01D 2239/086; B01D 2239/1216; B01D 2239/1225; B01D 2251/112; B01D 2253/25; B01D 2253/306; B01D 2257/308; B01D 2323/39; B01D 39/2079; B01D 39/2082; B01D 39/2089; B01D 67/0041; B01D 69/10; B01D 69/141; B01D 71/024; B01D 2325/02; B01D 2325/28; B01D 2325/30; B01D 67/0048; B01D 67/0051; B32B 2264/1023; B01J 21/04; B01J 21/12; B01J 20/284; B01J 2029/081; B01J 20/0207; B01J 20/06; B01J 20/28; B01J 20/28052; B01J 39/10; B01J 20/0233; B01J 20/041; B01J 20/08; B01J 20/28057; B01J 20/3204; B01J 20/3236; B01J 8/0476; B01J 8/067; B01J 20/04; B01J 20/28059; B01J 20/3021; B01J 20/3078; B01J 20/3092; B01J 2208/00221; B01J 2208/0023; B01J 2208/00982; B01J 2208/025; B01J 2208/026; B01J 23/66; B01J 23/685; B01J 23/686; B01J 23/687; B01J 23/688; C02F 1/281; C02F 1/003; C02F 2101/103; C02F 2101/14; C02F 2201/006; C02F 2305/08; C02F 1/42; C02F 1/001; C02F 1/008; C02F 1/28; C02F 1/44; C02F 1/441; C02F 1/444; C02F 1/463; C02F 1/4678; C02F 1/484; C02F 1/52; C02F 2001/46157; C02F 2001/46171; C02F 2101/105; C02F 2101/20; C02F 2201/007; C02F 2201/008; C02F 2209/40; C02F 2303/16; C02F 2303/26; C04B 14/303; C04B 14/1425; C04B 41/5031; C04B 35/62813; C04B 35/62582; C04B 2235/5224; C04B 2237/343; C04B 2111/105; C04B 2237/064; C04B 2237/562; C04B 2235/5228; C04B 2235/9653; C04B 2235/3217; C04B 2235/3218; C04B 2235/72; C04B 2235/441; C04B 2235/443; C04B 2235/5252; C04B 2235/5264; C04B 2235/5268; C04B 2235/5296; C04B 35/62236; C04B 35/6224; C04B 35/62245; C04B 35/624; C04B 35/6264; C04B 35/62892; C04B 35/63444; C04B 35/76; C07C 2521/04; C07C 2521/12; C01B 33/2823; C01B 39/16; Y10S 210/911; B82Y 30/00; D01D 5/0007; D10B 2101/08; D10B 2505/04
  See application file for complete search history.

(56) References Cited

U.S. PATENT DOCUMENTS

2011/0266213 A1* 11/2011 Jo ..................... C04B 35/62813
                                                     210/496
2014/0291246 A1* 10/2014 Tsukamoto ............. C02F 1/288
                                                     210/660
2015/0086437 A1*  3/2015 Matusz ................ B01J 20/3204
                                                     422/187
2016/0280566 A1*  9/2016 Rau, III .................. C02F 1/001

OTHER PUBLICATIONS

Rathore et al, Competitive Adsorption of Arsenic and Fluoride onto Economically Prepared Aluminum Oxide/Hydroxide Nanoparticles: Multicomponent Isotherms and Spent Adsorbent Management, Jun. 23, 2017, p. 1-2,4-12 (Year: 2017).*
Park et al, Clean and Facile Solution Synthesis of IronACHTUNGTRENUNG(III)-Entrapped g-Alumina Nanosorbents for Arsenic Removal, Apr. 2, 2008 (Year: 2008).*
Rao et al., Adsorption of Fluoride by Gamma Alumina, Feb. 17, 2007 (Year: 2007).*
Yu et al, Adsorptive removal of arsenate and orthophosphate anions by mesoporous alumina, Jan. 3, 2008 (Year: 2008).*
Lee et al, Enhanced adsorptive removal of fluoride using mesoporous alumina, Jul. 4, 2009 (Year: 2009).*
Ysla, A Simple Way to Produce γ-Alumina From Aluminum Cans by Precipitation Reactions, Apr. 18, 2016, p. 1 (Year: 2016).*
Boegger, Versatile PP Filter Cloths Available For Most Purposes, Mar. 24, 2016 (Year: 2016).*
Compas, Point-Of-Use Water Treatment Device For Disaster Relief, Dec. 2009 (Year: 2009).*
Al-Bayati, Determination of the Optimum Conditions for the Production of Gamma Alumina (γ-Al2O3) By the Precipitation Method of the Sodium Aluminate Solution, Jun. 2016 (Year: 2016).*
A. K. Shusheela, "Fluorosis in Developing Countries: Remedial Measures and Approaches," Proc. Ind Nat. A cad B 68, No. 5 (2002) pp. 389-400.
E. Kumar, A. Bhatnagar, II. Kumar, M. Sillinapaa, "Defluoridation from Aqueous Solutions by Nano-Alumina: Characterization and Sorption Studies," J. Haz. Mater 186 (2011) 1042-1049.
Shankar, Shiv et al.; "Arsenic Contamination of Groundwater: A Review of Sources, Prevalence, Health Risks, and Strategies for Mitigation"; The Scientific World Journal; Oct. 14, 2014; vol. 2014; 18 pp. Article ID 304524.
Jain, C. K. et al.; "Arsenic Occurrence, Toxicity and Speciation Techniques," Water Res.; vol. 34; No. 17; 2000; pp. 4304-4312.
M.D Kiping et al., "Arsine Poisoning in a Slag-Washing Plant," Brit. J. industry. Med., 1964, 21, 74 (1964) pp. 74-77.
Jack C. Ng et al, "A Global Health Problem Caused by Arsenic from Natural Sources," J. Chemosphere 52 (2003):1353-1359.
Smedley, P.L. et al.; "Hydrogeochemistry of arsenic and other inorganic constituents in groundwaters from La Pampa, Argentina"; Appl. Geochem 3; 17; 2002; pp. 259-284.

(56) References Cited

OTHER PUBLICATIONS

Burkel, Rebecca S. et al.; "Naturally Occurring Arsenic in Sandstone Aquifer Water Supply Wells of North-eastern Wisconsin"; Spring 1999 GWMR; pp. 114-121.
Bissen, Monique et al; "Arsenic—a Review. Part I: Occurrence, Toxicity, Speciation, Mobility"; Acta Hydrochim. Hydrobiol.; 31; 2003; 1; pp. 9-18.
K.R.Bulusu et al, "Fluorides in Water, Defluoridation Methods and their Limitations," National Environment Engineering Research Institute Nehru Marg., Magpur—440020, pp. 1-86.
Ning, Robert Y.; Arsenic removal by reverse osmosis; Desalination 143; 2002; pp. 237-241.
Vagliasindi, F. G. A. et al.; "Arsenic Removal in Fresh and Nom-Preloaded Exchange Packed Bed Adsorption Reactors," Water Sci Technol; vol. 38; No. 6; 1998; pp. 337-343.
Vivek, Ganvir et al. (Sep. 12, 2003) Specification entitled "A filter media for removal of fluoride ion contamination from water, a device and a method for purifying fluoride ion contaminated water," Granted Feb. 7, 2004, pp. 1-13.
Bavan et al. entitled "Ceramic Candle and Filtration system from treated Kimberrlite Waste for removal of Fluoride form Water rich in Fluoride Content," National Mineral Development Corporation Limited with Claims dated Dec. 17, 1999, pp. 1-7.
Fink, G.J. et al.; "Activated alumina for removing fluorides from Drinking Water"; Industrial and Engineering Chemistry; vol. 28; No. 8; pp. 947-948.
Dash, K. et al.; "Fluoride Removal from Ground Water by $\gamma$-Alumina Coated Ceramic Honeycomb"; Water Practice & Technology; vol. 5; No. 3; IWA Publishing 2010; doi: 10.2166/wpt.2010.061; 9 pp.
Specification relates to the development, design and operation of a reactor comprising a zero valent iron unit and a filtration system for water treatment dated Nov. 3, 2008, pp. 2-19.
Application with claims dated Jun. 17, 2013, pp. 1-10.
Tata Consultancy Services Limited (Mar. 16, 2006) Provisional Specification entitled "A Method For Preparing Filter Media For Removing Arsenic Contamination From Water, The Filter Media, A Device And A Method For Purifying Arsenic Contaminated Water," pp. 1-11.
Ravindhranath K., et al.; "Nano Aluminum Oxides as Adsorbents in Water Remediation Methods: a Review"; Rasayan *J. Chem.;* vol. 10, No. 3; 2017; pp. 716-722.
Mulugeta, Eyobel et al.; "Aluminium hydro(oxide)-based (AO) adsorbent for defluoridation of drinking water: Optimisation, performance comparison, and field testing"; Water SA; vol. 41; No. 1; Jan. 1, 2015; pp. 121-128; http://dx.doi.org/10.4314/wsa.v41i1.15.

\* cited by examiner

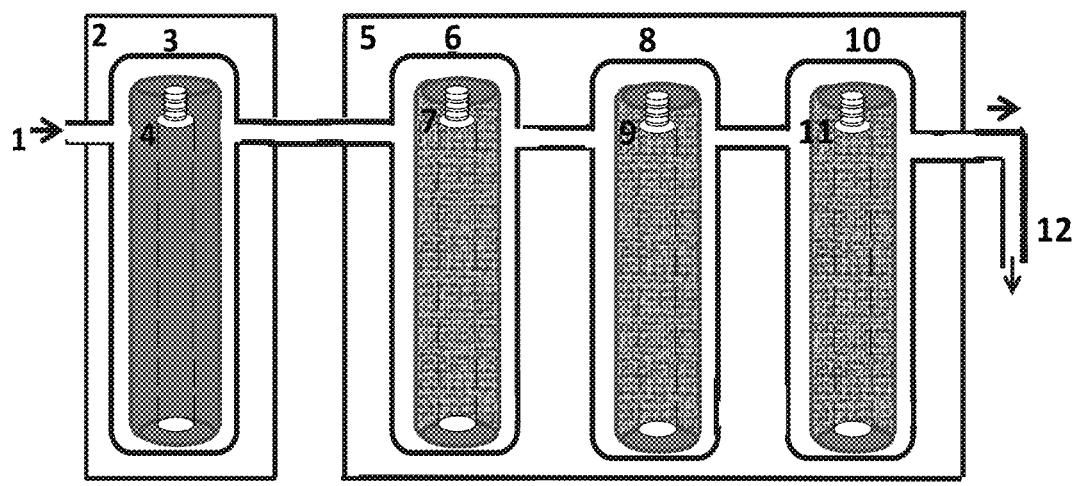
Fig. 1: The drawing of the purifier operating for continuous treatment

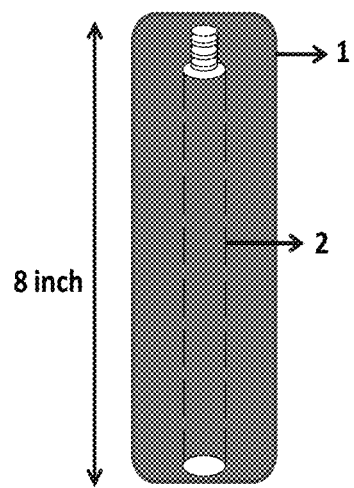
Fig. 2: Details of component 3 of Fig. 1

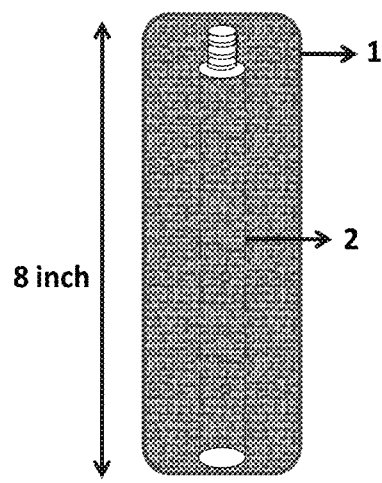
Fig. 3: Details of component 7, 9 and 11 of Fig. 1
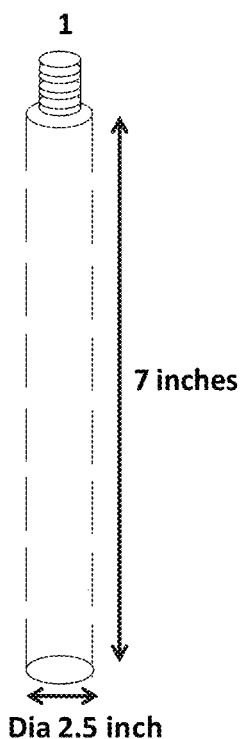
Fig. 4: View of perforated tube with the dimensions

NANOADSORBENT BASED USER-FRIENDLY HOUSEHOLD FILTER FOR THE PURIFICATION OF FLUORIDE AND ARSENIC CONTAMINATED DRINKING WATER

CROSS-REFERENCE TO RELATED APPLICATION(S)

This application claims priority to Indian Patent Application Number 201811019279, filed on May 23, 2018, the entire contents of which are incorporated herein by reference.

FIELD OF INVENTION

The present invention relates to a development of gamma nanoalumina particles a well-known adsorbent by low-cost process and a simple methodology of incorporation of the developed nanoadsorbent in the conventional sediment removal water filter/cartridges. More particularly, the present invention relates to a method of synthesis of low-cost nanoparticle of gamma alumina, a well-known adsorbent for fluoride and arsenic removal and their use in making of gravity operated household device useful for the treatment of up to 250 μg/l (ppb) arsenic and 10 mg/l (ppm) fluoride present in contaminated drinking water. Besides arsenic and fluoride removal, the developed device can also be used for the purification of heavy metals like chromium, lead, cadmium etc. contaminated water. Developed filtration technology is also very effective for maximum removal of bacteria, viruses etc.

BACKGROUND OF THE INVENTION AND DESCRIPTION OF PRIOR ART

Drinking water is a major source of fluoride and arsenic contamination that causes severe health problems. World health organization (WHO) has set the guidelines of 1.5 mg/l fluoride and 10 μg/l arsenic as their permissible limit in potable water. Though, fluoride is beneficial in prevention of cavities formation in the teeth and provides strength to skeleton system but drinking of excessive fluoride contaminated water start dental and skeleton fluorosis problem, whereas, arsenic is entirely a toxic element for human beings. In India only, more than seventy million people in nineteen states are suffering from fluorosis problems. Besides India, this problem is also common in countries like USA, China, Japan, Argentina, African and Gulf countries. As per report published in 2002, more than 23 nations have problems of excess fluoride in water [A. K. Shusheela, Proc. Ind Nat. A cad B 689, (2002) 289-400], [E. Kumar, A. Bhatnagar, U. Kumar, M. Sillinapaa, J. Haz. Mater 186 (2011) 1042-48]. Contamination of ground water due to arsenic is equally alarming. As per a study in 2007, over 150 million people in more than 70 countries are probably affected by arsenic poisoning of drinking water [S. Shankar, U. Shanker, Shikha, Scientific world journal (2014) 304524]. In India, seven states namely—West Bengal, Jharkhand, Bihar, Uttar-Pradesh, Assam, Manipur and Chhattisgarh state have so far been reportedly affected by arsenic contamination in groundwater. Arsenic-contaminated drinking water causes adverse health effects. Arsenic plays a crucial role in making disturbance in RNA and DNA synthesis, which consequently leads to cancer, the increased birth of exceptional children, low birth weights, malformed children and stillbirths [C. K. Jain, I. Ali, Water Res., 1 (2000) 4304-4312; M. D Kiping et al. Envi. & Man 6 (1997) 93-110; J. C. Negi et al, J. Chemosphere 9 (2003):1353-1359; P. L. Smedley et al. Appl. Geochem 3 (2002) 259-284; R. S. Burkel, R. C. Stoll, Remediation 2 (1999) 114-121]. Arsenite [As(III)] is found primarily as $H_3AsO_3$, $H_2AsO^{3-}$, $HAsO_3^{2-}$, and $AsO_3^{3-}$ is more toxic than arsenate [As(V)] and is metabolized faster and easily accumulated in nails and hair [M. Bissen, F. H. Frimmel, Acta Hydrochim, 319 (2003) 9-18]. Due to the seriousness of these problems, many technologies for the treatment of arsenic and fluoride contaminated drinking water have been developed during last six decades. But none of them could solve this problem so far to the fullest extent especially their application at household or domestic level.

The well-known Nalgonda technique [Nawlakhe, W. G., Kulkarni, D. N., Pathak, B. N. and Bulusu, K. R., Defluoridation of Water by Nalgonda Technique, Indian Journal of Environmental Health, 17 (1975) 26-65] is based on lime, an alum treatment process where alum (hydrated aluminium salt) acts as a flocculate for adsorption of fluoride or arsenic of water. However, this technique was not successful because of the multistage treatment process, maintenance and generation of a large amount of sludge. Bone char is another prominent defluoridation material, produces by the carbonizing bone at 1200-1600° C. The presence of calcium and phosphate in the bone char possess superior uptake quality for fluoride ion. The fluoride uptake is mainly based on ion exchange in which carbonate radical of the char comprising $Ca(PO_4)_6 \cdot CaCO_3$, is replaced by fluoride ion, forming insoluble fluoroapatite. This is one of the effective materials that used in defluoridation of water in many countries on community treatment level. However, it is a costly process and cannot be adopted in developing countries, like India. Among other methods, reverse osmosis [R. Y. Ning, Desalination 143 (2002) 237-241] and ion exchange [F. Vagliasindi, M. M. Benjamin, Water Sci Technol 38 (1998) 337-343] are effective processes for the fluoride or arsenic removal but they are costly processes.

TERAFIL water filter developed by Dr Kuntia of CSIR-IIMT, Bhubneswar, is basically made from a mixture of red clay (silt clay), river sand and wood saw dust without using any chemicals. This filter is used for removal of sediments and turbidity of water. Though this filter is cost effective and can be used at household level, it cannot be used for arsenic or fluoride removal from drinking water. A filter media developed by Kumar, P. K. Kapur, K. K. Das (Indian Patent Application number 1256/MUM/2003) comprising aluminium hydroxide coated rice husk ash is developed for the removal of fluoride ions from the contaminated drinking water. Fluoride removal capacity of the filter media is reported to be 7-8 mg/g which is not very effective adsorbent materials. The other drawback of the developed filter media is that different stages are involved in the preparation of filter. On the other side ceramic defluoridation filter candle developed by M. K. Dhar (Indian patent, 16/MAS/2000, classification number C04338/00, Ceramic candle and filtration system from treated Kimberlite waste for removal of fluoride from water rich in fluoride content) describes treatment of 20 liters/day of excessive fluoride containing water. The life of the candle is estimated to be two-three months. The filtration device includes a container with multiple holes at the bottom which is tied with course cloth to cover the holes, over the cloth calcined & chemically surface treated Kimberlite waste was filled (5 kgs). The above slated system handle 20 liters of water to average family consumption. Every other month the calcined Kimberlite has to be replaced. The candles made from treated Kimberlite has to be replaced after every three months. The drawback of the filtration device is that a huge amount of Kimberlite waste is used which require frequent replacement. Generation of a huge amount of exhausted Kimberlite waste is another problem of the developed system.

Fluoride removal based on the adsorption process comprises of separation of fluoride ions by adsorption on the alumina surface [Fink, G. J. and Lindsay, F. K. (1936), Activated alumina for removing fluorides from Drinking Water, Industrial and Engineering, 28(9), 947-948]. Activated alumina which presents in its gamma phase possess more surface area and thus is more effective for the removal of fluoride or arsenic or other inorganic toxic elements from the water as compared to other known adsorbents. After saturation with theses contaminated fluoride ions, it can be regenerated using low cost nontoxic chemicals like NaOH, $H_2SO_4$ and HCl. Fluoride removal from ground water by gamma alumina coated honeycomb at 11 mg/g removal rate is reported [K. Dash, U. S. Hareesh, R. Johnson, J. Arunachalam, Water Practice and Technology, IWA Publishing 2011 doi:10.2166/wpt.2010.061]. A number of patents have been filed for removal of arsenic of water using adsorption based filtration technology. An improved water treatment technology for removal of arsenic, iron and phosphate by zero valent iron and reactor developed by Khillar et al. [Indian patent application 2336/Mum/2008] can be operated with and without electricity. The said reactor comprising complex unit containing zero valent iron unit and filtration system. Another patent submitted by Viswnath Pal [Indian patent application number 341/KOL/2003] comprises passing arsenic contaminated drinking water through first an iron filter selected from gravel, sand and manganese dioxide and subsequently through a container having granular ferric hydroxide etc. for obtaining arsenic free water. The said treatment system is complex and can be operated without electric power. Another Indian invention related to development of household water filter comprises ferric hydroxide coated rice husk ash as adsorbent for the removal of arsenic from water [Vivek Ganvir et al. Indian patent application number 1257/MUM/2003]. Though, the developed filter has simplicity for water filtration, the coating of iron hydroxide over rice husk ash particles is tedious, multistep process and difficult to make at low cost in commercial level.

Further, reports by USEPA, 2003 suggest that activated alumina is the best material to reduce fluoride level below 1.5 mg/l (ppm), because it has got good affinity and selectivity for fluoride. However, use of large quantity of activated alumina in the column requires a lot of times in regeneration, choking of the column, are the main draw backs for the use of activated alumina for arsenic and fluoride removal of water. Because bigger particle size (0.4-1.2 mm), the adsorbent capacity of activated alumina for fluoride occurs very low (~2-4 mg/g). However, smaller particle size of alumina can increase the surface area and additionally it will have better mass transfer efficiency. It has been observed that nanoparticles of gamma alumina show better efficiency than activated alumina particles present in micrometer sizes [E. Kumar, A. Bhatnagar, U. Kumar, M. Sillinapaa, J. Haz. Mater 186 (2011) 1042-48]. Since nanoparticles have proven themselves as excellent adsorbents due to their unique features like high catalytic potential, reactivity, and large surface area etc, its small quantity could be sufficient for the treatment of fluoride or arsenic contaminated drinking water in a large volume. Recently I. B. Singh and Archana Singh [Indian patent submitted Ref. No. 0056NF2016] has developed low cost nanoalumina particles that could remove fluoride from water at 20-25 mg/g rate. It was observed that nanoadsorbent based household defluoridation device can treat 3000-4000 liters 2-3 mg/l fluoride contaminated water using one kg of synthesized low cost nanoadsorbent (Indian patent submitted Application No. 201811019279). Present patent is an improved version of earlier developed nanoadsorbent based defluoridation device that can remove both, fluoride as well as arsenic, is being submitted for its publication.

OBJECTS OF THE INVENTION

The main object of the present invention is to incorporate synthesized nanoparticles of gamma alumina into the conventional polypropylene make sediment removal cartridges which should work on gravity based filtration at 1-5 lit/h filtration rate.

Another important object of the invention is to make simple water filtration household device that should contain two or three number of nanoalumina incorporated cartridges and each cartridge should contains 130-150 g nanoparticles.

Yet another object of the present invention is to optimize flow rate of the developed household domestic device in such a way that maximum arsenic or fluoride adsorption occurs at the filtration rate in the range of 1 to 5 lit/h filtration rate.

Still another object of the filtration device that it should work on gravity force and no electricity require for the working of the device.

Yet another object of the filtration device that it should be compact and space saving in design.

Yet another object of the filtration device that one simple sediment removal cartridge should also be attached before entering water into nanoalumina incorporated cartridges to remove water turbidity and avoid choking problem of the device.

SUMMARY OF THE INVENTION

Present invention relates to development of a methodology of incorporating nanoparticles of well-known gamma alumina adsorbent developed by a cost effective method, in conventional sediment removal water cartridges make of polypropylene sheet (porosity 10-20 micron make cylindrical cartridges/filter: 7 inch length, 1-2.5 inch dia). 130-150 g synthesized low cost (~10 USD/kg) nanoparticles of gamma (γ) alumina of 20-30 mg/g fluoride adsorption capacity and 25-30 mg/g arsenic adsorption capacity, was incorporated successfully in the sediment removal cartridges/filter. Afterward, a simple household filtration device containing nanoalumina incorporated two or three cartridges arranged in series, overhead tank for keeping arsenic or fluoride contaminated water and treated water storage container was made.

The developed filtration device can filter water at 1-5 lit/h filtration rate without electricity. Present invention demonstrates a simple method of incorporation of nanoadsorbent in the conventional sediment removal filter and making of a household filtration device that can be used for treatment of arsenic or fluoride contaminated ground/drinking water. Two or three number of 130-150 g nanoalumina incorporated cartridges made filtration device can treat 50-100 µg/l arsenic contaminated 4000-10000 liters water and 2-5 mg/l fluoride contaminated 3000-6000 liters drinking water after 2-3 regenerations.

Two or three number of cartridges (size 7 inch in length and 1-2.5 inch in dia) containing 130-150 g incorporated nanoalumina are kept in housing in series whose inlet is attached to the overhead tank containing contaminated water and outlet is connected in plastic container where treated water is stored. The treatment cost is estimated to occur around 0.15-0.25 USD/100 liters for 50-100 µg/l arsenic and 0.25-0.50 USD/100 liters for 2-5 mg/l fluoride contaminated water.

BRIEF DESCRIPTION OF DRAWINGS

FIG. 1: The drawing of the purifier operating for continuous treatment.
  Component 1: Inlet of the contaminated water.
  Component 2: First chamber containing only the sediment cartridge.
  Component 3: Housing 1.
  Component 4: Cartridge containing the hollow perforated tube wrapped with carbon containing polypropylene cloth.
  Component 6, 8 10: Housing containing the cartridges with the nanolumina.
  Component 7, 9, 11: Cartridges containing hollow perforated tube wrapped with the nanoalumina coated polypropylene cloth.
  Component 12: Outlet for the treated water.
FIG. 2: Detailed view of component 3 of FIG. 1.
  Component 1: Polypropylene cloth with carbon only wrapped around the perforated hollow tube.
  Component 2: Perforated hollow tube.
FIG. 3: Detailed view of component 7, 9 and 11 of FIG. 1.
  Component 1: Polypropylene cloth coated with nanoalumina wrapped around perforated hollow tube.
  Component 2: Perforated hollow tube.
FIG. 4: Detailed view of perforated tube with the dimensions.
  Component 1: Hollow perforated tube.

DETAILED DESCRIPTION OF THE INVENTION

In an embodiment of the present invention, methodology developed for the incorporation of nanoparticles of alumina in sediment removal filter/cartridges, can be adopted for any types of adsorbent. The low cost nanoparticle of gamma alumina is synthesized to bring down fluoride treatment cost significantly low [I. B. Singh, Archana Singh, Indian patent submitted, Application No: 0056NF2016]. Firstly, sodium aluminate was prepared by pure aluminum metal in 2M sodium hydroxide solution. The prepared sodium aluminate is subjected for precipitation reaction under stirring condition and by drop-by-drop addition of 2M sulphuric acid solution till pH reached at around 7. White gel like precipitates formed which is mainly hydrous aluminum hydroxide $Al(OH)_3 \cdot nH_2O$. This is heated at a temperature in the range of 480° to 500° C. in muffle furnace for five hours followed by their grinding in mechanized mortar pistil for 5-6 hour to get nanoparticle of gamma alumina of size in the range of 20-25 nm of surface are in the range of around 250-300 m²/g. Finally, the adsorption kinetics study of fluoride and arsenic in water was carried out to see the removal potential of the synthesized nanoparticles of gamma alumina. Before incorporating in sediment removal cartridge, fluoride and arsenic adsorption capacity of the synthesized nanoparticles was estimated through adsorption studies, are found as 20-30 mg/g and 25-30 mg/g, respectively.

In another embodiment of the present invention, 130-150 g synthesized nanoparticles of gamma alumina have been incorporated in conventional sediment removal cartridge made of polypropylene cloth sheet. For making a cartridge, one end closed perforated polymer make cylindrical tube (diameter 30 mm, length 230 mm, thickness 1 mm) is used, whose another end was threaded and can be fixed properly in the housing. In making of filter candle, firstly one layer polypropylene make thread is wrapped over the perorated tube (FIG. 1-5). Incorporation of the nanoalumina particle in the cartridges is made through nanocoating methodology (thickness in the range of 400-500 µm) over polypropylene sheet/cloth layer by layer coating. In this way 140-150 g synthesized nanoparticles of gamma alumina were incorporated in each filter cartridges/candle.

In yet another embodiment of the present invention, household filtration device was made (FIG. 1-5) where two or three number of nanoparticle incorporated filter cartridges were fitted in housing in series in which outlet of the first is connected to inlet of the second one. Similarly, the outlet of the second connected to the inlet of the third one and outlet of third cartridges open in the storage container where treated water gets stored. The inlet of first housing is connected separately to the outlet of standard sediment removal cartridges containing carbon whereas the inlet of the standard sediment removal filter is connected to 20-50 liters capacity overhead tank from where fluoride or arsenic contaminated water enters into the standard sediment removal filter and then the nanoadsorbent containing cartridges. In addition to the removal of turbidity, physical impurities, sediment etc, standard sediment removal also removes odors, smell, and color of the contaminated water. 50-100 µg/l arsenic or 2-5 mg/l fluoride is mixed accordingly in water of overhead tank which contain the cation from the group consisting of sodium, potassium, calcium, magnesium etc. and anions from the group consisting of chloride, nitrate, sulphate, carbonate, bicarbonate etc which are generally present in ground water. The height of the overhead tank from the candle housing can be kept 3-4 feet above and adjustable in order to maintain flow rate of around 1-5 lit/h. Every after 100 liters of filtration residual arsenic or fluoride present in the treated water was analyzed.

In still another embodiment of the present invention, residual fluoride was analyzed by spectrophotometer (Hack39000) using alizarin red visual method and Spand solution whereas arsenic was analyzed using Hack arsenic kit. Alizarin red indicator was prepared using zirconyl chloride octahydrate ($ZrOCl_2$) and mg alizarin red dye (3-alizarin sulphonic acid sodium salt). In the presence of fluoride ions, zirconium ions get replaced by fluoride ion from the complexes resulting in re-appearance of original yellow color of zirconium. Concentration of residual fluoride was determined by comparing color of standard solution of fluoride in water. The intensity of yellow color depends on the concentration of residual fluoride present in the working solution. In preparation of standard solution, blank (0.0), 0.2, 0.4, 0.6, 0.8, 1.0 and 1.2 mg/L fluoride bearing water solutions were prepared in 50 ml volume containing nessler tube. 5 mL of prepared alizarin red indicator was added in each solution which showed different shades of color from dark red (blank) to faded yellow (fluoride bearing). Solutions were also prepared from the filtrates obtained after batch adsorption in identical condition.

In another embodiment of the present invention, the experimental design was customer specified and was modified to understand the performance of candle filter for testing bacteria removal efficiency of the developed cartridges. The removal studies in treated water are done as per U.S. Environmental Protection Agency (USEPA) and NSF International standard using test bacteria—*Klebsiella terrigen* (1-3×103 CFU/100 ml); Virus—MS2 Bacteriophage (1-3×103 CFU/L); Cyst of Giardia (1-3×103 CFU/L) in 20 liters water which passed through the filter at 1-2 lit/h filtration rate. Bacteria removal studies are done by membrane filtration and standard plate count using selective media method. Virus removal studies are carried out using agar overlay method while cyst removal studies are done by microscopy technique.

EXAMPLES

Example 1

130-140 g nanoparticles incorporated both filters candle shown more than 95% fluoride removal (treated water contains 0.5-0.8 ppm) of 5 ppm fluoride containing initial 200 liters of water with filtration rate nearly in the range of 0.8 liter-1 liter/h (20-4 lit in 24 h). Even single filter candle shown more than 90% fluoride removal (treated water contains ~1 ppm fluoride) of 5-5 ppm fluoride containing water with filtration rate of 1 lit/h (24 liters in 24 h). Both filters have also shown fluoride removal capability for 10 mg/l fluoride containing water as more than 90% fluoride removal (treated water contains 0.8-1.0 ppm) was obtained for 10 mg/l fluoride containing water.

Example 2

As given in example 1, both filters show more than 90% fluoride removal (treated water contain 0.8-1.0 ppml fluoride) of 5.5 ppm fluoride containing another 200 liters of water (total 400 liters) with filtration rate of 0.8 lit/h (20 liters in 24 h). Single filter candle shown nearly 70 fluoride removal (treated water contain around 1.2-1.4 mg/l fluoride) of 5 ppm fluoride containing water after 400 liters of treatment. Both filters have shown fluoride removal capability of 10 mg/l fluoride containing water as more than 80% fluoride removal (treated water contains 1.3-1.5 ppm fluoride) is obtained after treatment of 400 liters 10 mg/l fluoride water. This indicated that both filters can also treat maximum 350-400 liters water containing more than 10 mg/l fluoride.

Example 3

As given in example 1, both filters show more than 80% fluoride removal (treated water contain 1.1-1.4 ppml fluoride) of 5.5 mg/l fluoride containing another 200 liters of water (total 600 liters). Fluoride removal capability of single filter candle decreases substantially after 500 liters of 5 ppml fluoride containing water as 2.5-3.0 mg/l residual fluoride was obtained in treated water using single filter after treatment of 500 liters of 5.5 ppm fluoride water. The fluoride removal capability of both filters reduces significantly for treatment of 10 mg/l fluoride water as around 3.0-3.5 ppm residual fluoride was found in treated water of 10 mg/l fluoride containing water.

Example 4

As given in example 1, both filters show more than 70% fluoride removal (treated water contain around 1.3-1.5 ppml fluoride) of 5.5 ppml fluoride containing another 200 liters of water (total 800 liters). Occurrence of 1.3-1.5 mg/l in treated water is almost within the WHO prescribed limit of 1.5 mg/l fluoride in drinking water.

Example 5

As given in example 1, both filters show more than 60% fluoride removal (treated water contain around 1.6-1.90 ppm fluoride of 5.5 ppml fluoride containing another 200 liters of water (total 1000 liters). Presence of more than 1.5 ppm fluoride in treated water exceeded the WHO guidelines of maximum permissible level of fluoride (1.5 mg/l) in drinking water. Therefore, both filters can treat a maximum 700-800 liters of 5.5 ppm fluoride water.

Example 6

As given in examples 1-5, concentration the different cations and anions present in the tape water, is found almost same after fluoride removal. This indicates that present synthesized nanolaumina particles show their ability of fluoride adsorption without affecting concentration of other mineral constituents of water.

Example 7

As given in examples 1-5, a slight turbidity of treated water is observed for initial 2-3 liters of filtration. Afterward filtered water was observed crystal clear without any turbidity. This indicates that incorporated nanoparticles do not diffuse from the nanoparticles incorporated polypropylene cloth in the treated water.

Example 8

140-150 g nanoparticles incorporated three cartridges containing filtration device shown more than 90% fluoride removal, (treated water contains 0.2-0.7 mg/l fluoride) of 5 mg/l fluoride containing 500 liters of tap water (pH 6.5-8.3, TDS 310-350 mg/l) with filtration rate of 3-5 lit/h. Above device has also shown fluoride removal capability for 10 mg/l fluoride containing water as more than 85% fluoride removal (treated water contains 0.5-1.5 mg/l) was obtained for 10 mg/l fluoride containing water up to 500 liters volume.

Example 9

140-150 g nanoparticles incorporated three cartridges containing filtration device shown more than 90% arsenic removal (0-6 μg/l) of 100 μg/l arsenic containing initial 1000 liters tap water (pH 8.1-8.3, TDS 310-350 mg/l) with filtration rate of 3-5 l/h. Above device have also shown arsenic removal capability for 250 μg/l arsenic containing water as 500 liters of 250 ppb arsenic containing water can be treated that contains 5-20 μg/l arsenic as residual arsenic in treated water.

Example 10

As given in example 1, above filtration device has shown more than 85% fluoride removal (treated water contain 0.7-1.0 mg/l fluoride) of 5 mg/l fluoride containing another 500 liters of water (total 1000 liters). The fluoride removal capability of the filtration devices reduces slightly for treatment of 10 mg/l fluoride water as around 1.2-1.6 mg/l fluoride occurred in treated water after treatment of next 500 liters of 10 mg/l fluoride containing water.

Example 11

As given in example 2, above filtration device has shown more than 90% arsenic removal (treated water contain 6-9 μg/l arsenic) of 100 μg/l ppb arsenic containing another 1000 liters tap water (total 2000 liters).

Example 12

As given in example 1, developed filter device shown more than 80% fluoride removal (treated water contain around 1.0-1.4 mg/l fluoride) of 5 mg/l fluoride containing another 500 liters of water (total 1500 liters). Occurrence of 1.1-1.4 mg/l in treated water is within the WHO prescribed limit of 1.5 mg/l fluoride in drinking water.

Example 13

As given in example 2, developed filter device has shown more than 85% arsenic removal (treated water contain around 9-15 μg/l arsenic) of 100 μg/l arsenic containing another 1000 liters of water (total 3000 liters). This concentration of arsenic in treated water is almost nearby in the range of WHO prescribed limit of 10 μg/l arsenic in drinking water.

Example 14

As given in example 1, developed filter device shown more than 70% fluoride removal (treated water contain around 1.4-1.8 mg/l fluoride) of 5 mg/l fluoride containing another 500 liters of water (total 2000 liters). Presence of this range of fluoride in the treated water is almost equal to the permissible limit of fluoride in drinking water as per WHO guidelines. Therefore, developed filter device can treat maximum 1500-2000 liters of 5 mg/l fluoride water before saturation.

Example 15

As given in example 2, developed filter device remove more than 80% arsenic removal (treated water contain around 10-20 μg/l arsenic) of 100 μg/l arsenic containing another 1000 liters of water (total 4000 liters). Presence of 10 μg/l arsenic fluoride in treated water is around the permissible limit of arsenic in drinking water as per WHO guidelines. Therefore, developed filter can treat maximum 3000-3500 liters of 100 μg/l arsenic containing water.

Example 16

Based on example 7, it is estimated that developed filter device can treat more than 3000-4000 liters of 2-3.0 mg/l fluoride containing water before saturation.

Example 17

Based on example 8, it is estimated that developed filter device can treat 6000-7000 liters of 50-60 μg/l arsenic containing water before saturation.

Example 18

As given in example 1-10, concentration of the different cations and anions present in the tap water, is found almost same after arsenic or fluoride removal. This indicates that present synthesized nanolaumina particles shows their strong affinity for arsenic or fluoride of water without affecting concentration of other mineral constituent of water.

Example 19

As given in example 1-10, a slight turbidity of treated water is observed for initial 5-10 liters of filtration. Afterward filtered water becomes clear without any turbidity. This indicates that incorporated nanoparticles do not diffuse from the polypropylene cloth in the treated water.

Example 20

As given in example 9, the saturated nanoadsorbent of the filter can be regenerated by use of 1.5-2.0% sodium hydroxide solution and 1.5-2% sulphuric acid or 4-5% aluminum sulphate solution.

Example 21

As given in example 7 and 13, the regenerated nanoadsorbent of the developed device can further treat another 1000-1500 liters of 5 mg/l containing tap water of TDS<300 mg/l and pH 6.5-8.3 range.

Example 22

As given in example 8 and 13, the regenerated nanoadsorbent of the developed device can further treat another 1200-1800 liters of 100 μg/l arsenic containing tap water of TDS<300 mg/l and pH 6.5-8.5 range.

Example 23

As given in example 7 and 8, the saturated nanoadsorbent can be regenerated and reused for the fluoride and arsenic removal after three regenerations.

Example 24

As given in example 1 and 2, nearly 90% removal of bacteria and more than 99% removal of viruses and cyst are observed.

Advantages of the Present Invention

Methodology developed for the incorporation of nanoparticles of alumina in conventional sediment removal cartridges/candle is simple and feasible in making at large scale.

Developed household water treatment device is very simple that contains nanoalumina incorporated cartridges/candle, housing, overhead tank, tubing and treated water storage container.

The developed filtration device work on gravity force, hence no electricity requires.

The developed filtration device can provide safe drinking water at very low treatment cost of 0.5 USD/100 liters for 1-5 mg/l fluoride and 0.15 USD/100 liters for 90-100 μg/l arsenic contaminated water.

Present synthesized nanoparticles of gamma alumina that possess an excellent fluoride removal capacity, is of very low cost (~10 USD) and can be synthesized in bulk scale using inexpensive raw materials like aluminium, salt, sodium hydroxide, etc.

140-150 g nanoalumina incorporated cartridges is of very low cost (<5 USD/cartridge) including cost of synthesized nanoalumina particles using present low cost synthesis method.

The cost of filtration device containing low cost synthesized nanoalumina incorporated filters/cartridge as claim in 1 & 2, along with housing, overhead tank, tubing and treated water storage container, etc is of very low cost of around 25 USD.

Besides removal of arsenic and fluoride, developed nanoalumina incorporated filtration device can also remove chromium, lead, cadmium, etc of drinking water.

Present synthesized nanoadsorbent also acts as antiviral and antibacterial and thus destroys these microorganisms up to maximum level.

The fluoride treatment cost using domestic defluoridation device as claimed in claim 1, would be <0.5 USD/100 liters for 4-5 mg/l fluoride water after 2-3 regenerations.

The arsenic treatment cost using domestic filtration device as claimed in claim 1, would be <0.25 USD/100 liters for 90-100 µg/l arsenic (III) water.

The invention claimed is:

1. A filter cartridge, the filter cartridge comprising a polypropylene cloth coated with 130-150 g of a gamma alumina nanoadsorbent,
    wherein the gamma alumina nanoadsorbent is coated on the polypropylene cloth to a thickness of 400 to 500 µm,
    wherein the gamma alumina nanoadsorbent has a size in a range of 20 to 25 nm, and
    wherein the filter cartridge is connected to an inlet of an overhead tank containing contaminated water, and the filter cartridge is connected to an outlet of a container where treated water is stored.

2. The filter cartridge as claimed in claim 1, wherein the gamma alumina nanoadsorbent is formed by a synthesis of gamma alumina nanoparticles using sodium aluminate formed using aluminum metal and sodium hydroxide.

3. The filter cartridge as claimed in claim 1, wherein the filter cartridge uses the force of gravity for filtration, without using electricity.

4. The filter cartridge as claimed in claim 1, wherein a filtration rate can be adjusted by increasing a height of the overhead tank containing contaminated water.

5. The filter cartridge as claimed in claim 1, wherein the filter cartridge removes 20-30 mg/g fluoride ions and 25-30 mg/g arsenic (III).

6. A filter cartridge, the filter cartridge comprising a polypropylene cloth coated with 130-150 g of a gamma alumina nanoadsorbent,
    wherein the gamma alumina nanoadsorbent is coated on the polypropylene cloth to a thickness of 400 to 500 µm,
    wherein the gamma alumina nanoadsorbent has a surface area in a range of 250 to 300 $m^2/g$, and
    wherein the filter cartridge is connected to an inlet of an overhead tank containing contaminated water, and the filter cartridge is connected to an outlet of a container where treated water is stored.

* * * * *